United States Patent [19]

Edgley

[11] 4,371,133
[45] Feb. 1, 1983

[54] DUCTED PROPELLER AIRCRAFT

[75] Inventor: John K. Edgley, Elsworth, England

[73] Assignee: Edgley Aircraft Limited, Cambridgeshire, England

[21] Appl. No.: 145,341

[22] Filed: Apr. 30, 1980

[30] Foreign Application Priority Data

May 1, 1979 [GB] United Kingdom ............... 7915156

[51] Int. Cl.$^3$ .................... B64D 27/02; B64C 3/32
[52] U.S. Cl. ............................. 244/54; 244/67; 244/13
[58] Field of Search ............... 244/34 A, 13, 67, 54, 244/60, 126

[56] References Cited

U.S. PATENT DOCUMENTS

| Re. 18,457 | 5/1932 | Lord | 244/54 |
|---|---|---|---|
| 1,833,258 | 11/1931 | O'Connor | 244/126 |
| 2,558,501 | 6/1951 | Turner | 244/67 |
| 2,971,724 | 2/1961 | Zborowski | 244/34 A |
| 2,994,493 | 8/1961 | Hartman | 244/12.6 |
| 3,563,500 | 2/1971 | Fischer | 244/65 |
| 4,022,018 | 5/1977 | Tuten et al. | 244/54 |

FOREIGN PATENT DOCUMENTS

| 18820 | 11/1980 | European Pat. Off. |
| 1506089 | 7/1969 | Fed. Rep. of Germany |
| 1781112 | 10/1970 | Fed. Rep. of Germany |
| 1923862 | 11/1970 | Fed. Rep. of Germany |
| 2119288 | 11/1972 | Fed. Rep. of Germany |
| 439805 | 12/1935 | United Kingdom |
| 851379 | 10/1960 | United Kingdom |
| 910350 | 11/1962 | United Kingdom |
| 1302228 | 1/1973 | United Kingdom |
| 1444358 | 7/1976 | United Kingdom |
| 1540654 | 2/1979 | United Kingdom |

OTHER PUBLICATIONS

Abstract for Belgium Patent #457491, Inventor: Tips, Sep. 5, 1944.
Design For Flying, by David B. Thurston, pp. 161, 162 & 163.
Gas Turbines and Jet Propulsion for Aircraft, G. Geoffrey Smith, M.B.E., pp. 2, 7-9, 29-31.

Primary Examiner—Galen L. Barefoot
Assistant Examiner—Thomas J. Brahan
Attorney, Agent, or Firm—Birch, Stewart, Kolasch & Birch

[57] ABSTRACT

A ducted propeller aircraft from which visibility is excellent and which is capable of operating quietly and efficiently has a propeller shroud which serves as a primary load path to pass bending and torsional stresses to which the mainplane is subject in use between the portions of the mainplane either side of the shroud, the shroud defining a duct which is unimpinged upon by any portion of the turbulent airflow emanating from the mainplane.

16 Claims, 12 Drawing Figures

DUCTED PROPELLER AIRCRAFT

FIELD OF THE INVENTION

The present invention relates to aircraft. More particularly, the invention is concerned with aircraft which have a thrust-producing power plant incorporating a propeller which is a so-called ducted propeller (sometimes referred to as a "ducted propulsor"). Ducted propellers can provide a more efficient utilization of engine power at lower air speeds than conventional propeller installations, together with significantly lower tip speeds making them generally quieter in operation.

DESCRIPTION OF THE PRIOR ART

There have previously been proposed aircraft which comprise a fuselage, a cabin within the fuselage at a forward location, a mainplane, and a ducted propeller carried by the fuselage aft of the cabin. Such a configuration can afford excellent visibility from and convenient access to, the cabin, low cabin noise levels, and a low "ground hazard". However, the designers of all such aircraft known to the present inventor have hitherto chosen to attach the mainplane directly to the fuselage and so to dispose the ducted propeller and the mainplane that the propeller duct is immediately behind or above the wing roots, in some cases the trailing edges of the wing roots actually extending into the upstream end of the duct.

When an aircraft of such a configuration is operated, the air flow through the propeller duct is subject to considerable disturbance from a portion of the turbulent airflow emanating from the mainplane. In fact, tests by the present inventor on such an arrangement have shown that, even at zero angle of incidence of the mainplane, the action of its wake upon the propeller duct flow can be such as to cause severe separation of the flow incident on the propeller from the interior surface of the duct-defining shroud over a significant portion of the circumference thereof. Such separation has the undesirable effect of reducing the propulsive efficiency and increasing the noise generation of the power plant, and it is believed that each of these undesirable effects would be ameliorated if the propeller duct flow were to be freed from the effects of the mainplane wake.

SUMMARY OF THE INVENTION

Accordingly, the solution of this particular problem is one object of the present invention. However, as will become clear from the particular description which follows, the invention is in no way restricted in its applicability solely to aircraft of the general configuration defined above.

The quietness of operation which a ducted propeller has the potential to achieve when it is not subject to turbulent airflow is particularly attractive in light aircraft for use in flying overland at relatively low altitudes. Accordingly, it is a further object of the invention to provide such an aircraft having the capability to fly at slow airspeeds and from which visibility is excellent.

The shroud defining the duct of the propeller is an annular (whether circular or non-circular) component of substantial dimensions. It is another object of the invention to locate the shroud relative to the other components of the aircraft so that a neat and efficient configuration results and full use is made of the structural strength which the shroud is capable of providing.

The invention accordingly resides in an aircraft having a lift-producing mainplane, a prime mover, a propeller driven by the prime mover in use to produce by movement through the ambient air sufficient thrust for flight of the aircraft, the propeller being located intermediate the port and starboard ends of the mainplane, and an annular shroud defining a duct surrounding the propeller, characterized in that:
  (i) the duct has an upstream end so located relative to the mainplane that it is unimpinged or substantially unimpinged upon by any portion of the turbulent airflow emanating from the mainplane, and
  (ii) the shroud serves as the or a primary load path along which torsional and bending stresses to which the mainplane is subject in use are passed between the portion of the mainplane to the port side of the shroud and the portion of the mainplane to the starboard side of the shroud.

DESCRIPTION OF THE PREFERRED EMBODIMENTS

Figure 1:
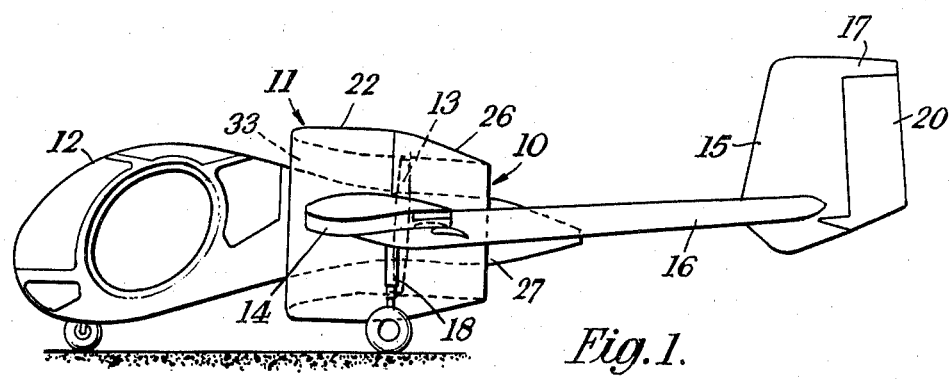
FIGS. 1 and 2 are respectively elevation and plan views of a first embodiment of an aircraft according to the invention.
Figure 2:
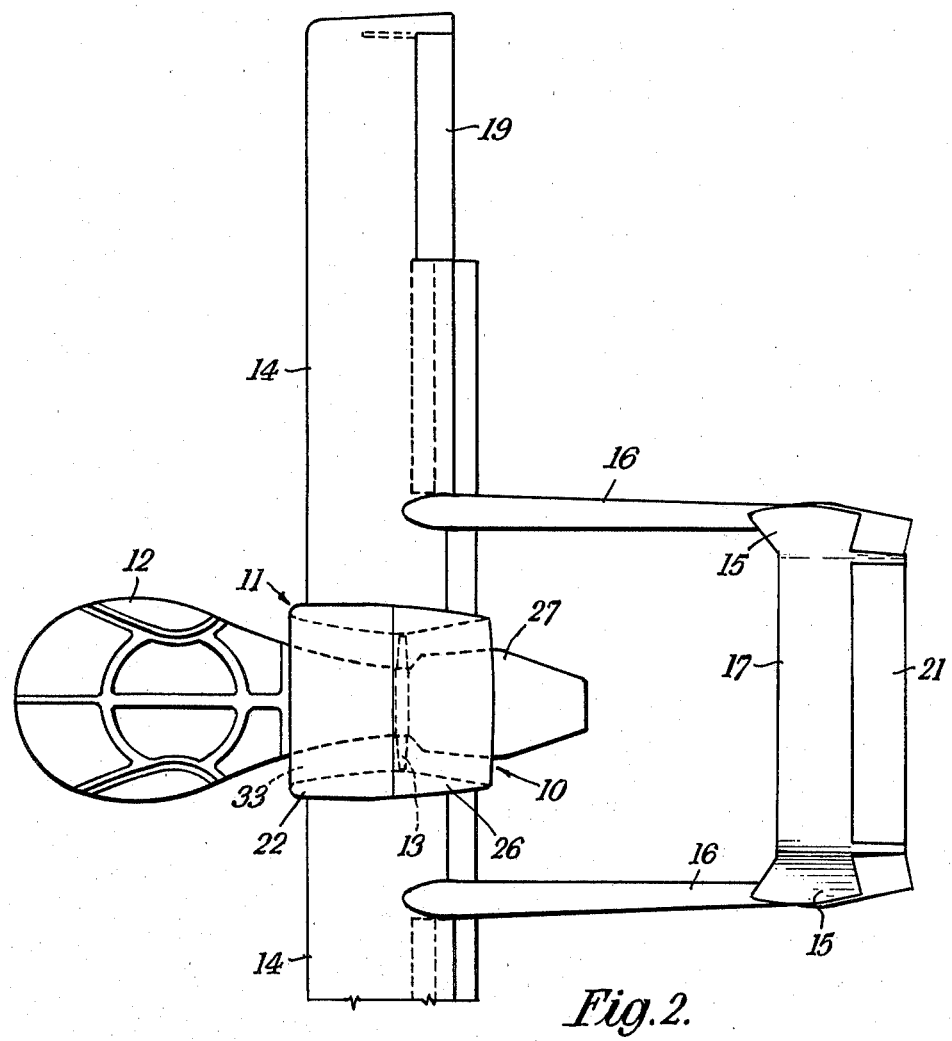

In FIGS. 1 and 2 there is illustrated an aircraft comprising a ducted propeller unit generally indicated at 10 having a shroud indicated generally at 11 which carries a cabin 12 at a position forward of a propeller 13 within the shroud. Also carried by the shroud is a mainplane 14, a pair of fins 15 carried by twin booms 16 extending from the mainplane 14, and a tailplane 17. The aircraft has an undercarriage 18. The mainplane fin and tailplane are respectively provided with roll 19, yaw 20 and pitch 21 control surfaces, as is conventional.

Figure 3:
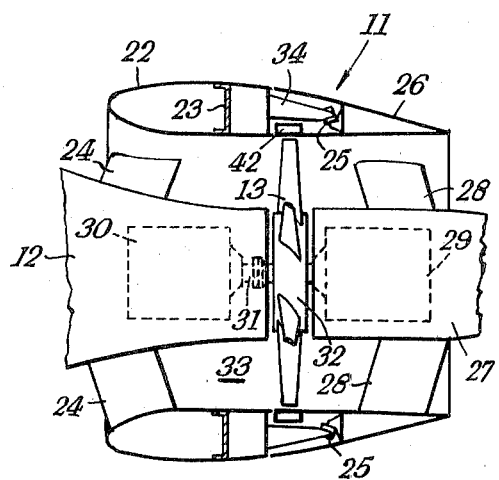
FIG. 3 is a vertical section of a ducted propeller incorporated in the aircraft according to FIGS. 1 and 2.

Referring now to FIG. 3, the ducted propeller unit is seen to comprise the propeller 13 carried for rotation by and within the shroud 11 which is of streamlined, quasi-aerofoil section. To a leading portion 22 of the shroud, which includes an annular main spar 23, the cabin 12 is attached by means of load-bearing elements 24 hereinafter referred to as cabin stator blades. The stator blades 24 are constructed with a transverse (in the sense of the airflow through the duct) cross-sectional area as small as possible consistent with their load-bearing function and are profiled for minimum disturbance of the airflow through the duct. The illustrated arrangement of five equi-spaced, radially directed stator blades 24 is shown solely for the purpose of explanation and the actual number, spacing and orientation of stator blades to be used in any particular embodiment of an aircraft according to the invention will be dependent upon numerous factors apparent to those skilled in the art.

The main spar 23 in the leading portion 22 of the shroud is contiguous with the main spar of the mainplane 14. Aft of the spar 23, however, there is mounted on the leading portion 22 a vibration-isolating mount comprising mountings 25, by which is carried on the leading portion 22 a trailing portion 26 of the shroud 11. The trailing portion itself supports a nacelle 27 through aft stator blades 28, the nacelle housing a prime mover 29 to which the propeller 13 is directly mounted. In a variant a further prime mover 30 located in the cabin 12 is connected to the propeller 13 by way of a flexible coupling 31. In this way, the aircraft includes an "engine pod" comprising the propeller 13, prime mover 29, nacelle 27, aft stator blades 28, and shroud trailing portion 26, which pod is carried on the shroud leading portion 22 and isolated in vibration from the remainder of the airframe by the mount, but which can vibrate as a whole thereby reducing the likelihood of the tips of the propeller blades fouling the surrounding portion of the shroud trailing portion 26. Likewise, stresses leading to elastic deformation of the leading portion 22 of the shroud, i.e. the primary shroud structure, should not be transferred to the shroud trailing portion 26. Where the further prime mover 30 is provided, it is mounted on flexible mountings (not shown) within the cabin 12 and the flexible coupling 31 permits it to vibrate relative to the propeller 13. There is then provided within the hub 32 of the propeller 13 means (not shown) for disconnecting the drive of either one of the prime movers 29 and 30 e.g. in the event of engine failure.

In use of the aircraft, the blades of the propeller 13 impel ambient air through the annular duct 33 defined between the shroud 11, the hub 32, the cabin 12 and the nacelle 27 thereby to generate thrust for flight.

Figure 4:
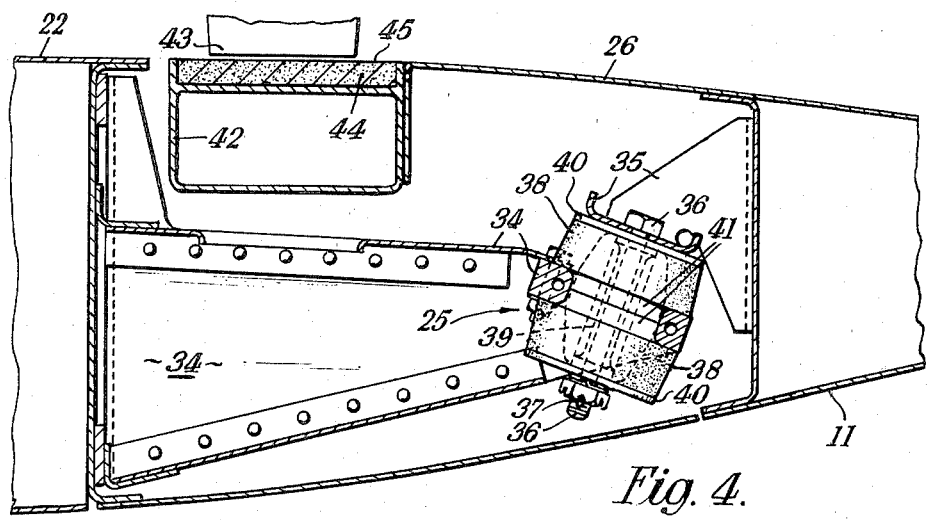
FIG. 4 is a fragment of the propeller shown in FIG. 3, drawn to a larger scale, showing one of the flexible mountings for the engine pod.

As illustrated in FIG. 4, each vibration-isolating mounting 25 comprises a bracket 34 on the leading portion 22 of the shroud connected to a bracket 35 on the shroud trailing portion 26 by means of a nut and bolt 36 retained by a split pin 37. While the bolt is received in a close-fitting aperture in the bracket 35, the aperture in the bracket 34 on the leading portion 22 of the shroud is much larger than the cross-section of the bolt 36 thereby permitting a degree of movement between the leading and trailing shroud portions. This movement is controlled by a pair of annular mounting blocks 38 of tough, elastomeric material held by the brackets 34 and 35 and a spacer 39 around the bolt 36. Bonded to each of the blocks 38 is a steel flat washer 40 and a shaped collar 41 which is received snugly within the aperture of the bracket 34. The spacer 39 prevents over-tightening of the bolt 36. The mounting blocks 38 are supplied by the Lord Corporation of U.S.A. and their construction will be familiar to those skilled in the art.

As best seen in FIG. 4, in a further precaution against fouling of the shroud by the tips of the propeller blades, the portion of the shroud, which lies in the plane of the fan incorporates a substantially rigid, circular ring 42 of box-section to permit a constant close clearance to be maintained between the blade tips 43 and the surrounding shroud structure. Positioned into the portion of this ring 42 which is immediately adjacent to the propeller blade tips is an annulus 44 of rigid polyurethane foam or like soft but rigid material of radial thickness about 12 mm which will not cause damage to the blade tips in the (unlikely) event of contact occurring under extreme aerodynamic or other loading. The working clearance between the blade tips 43 and the shroud interior skin 45 is typically in the region of 1 to 2 mm for each meter of the propeller diameter.

Figure 5:
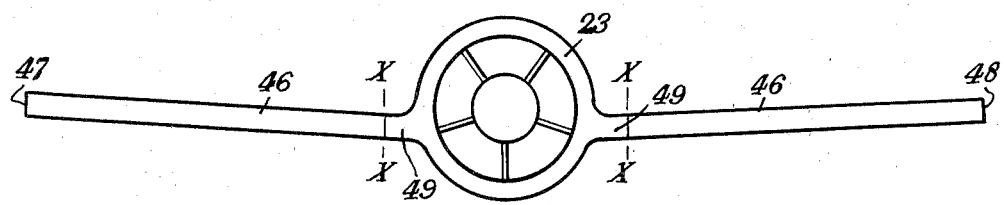
FIG. 5 shows the general arrangement, in a vertical plane, of the main spars of the shroud and mainplane of the aircraft of FIGS. 1 and 2 and FIGS. 6 and 7.

As is apparent from FIGS. 1 and 2, the primary load path between the mainplane and the remainder of the aircraft illustrated therein for the passage in particular of wing torsional and bending stresses is effected not between the wing roots and a fuselage structure as in prior, ducted propeller-equipped aircraft, but between the wing roots and the leading portion 22 of the streamlined shroud 11. From FIG. 5 it will be appreciated that the main spar 23 of the shroud and a main spar 46 of the mainplane form a continuous load-bearing structure extending inboard from one wing-tip 47, all around the shroud 11, and then outboard to the other wing-tip 48, which structure is a distinctive feature of the illustrated aircraft and would be present where another type of primary structure is employed, be it of single spar, multiple spar or any other construction. In the illustrated embodiments, the main spar 23 within the shroud 11 is in the form of a built-up, circular frame with a stub 49 of a mainplane spar rigidly attached at either side. The joint at each wing root between the spar 23 and stub 49 is permanent and, if detachable wings are desired, then each mainplane spar 46 could be detachably jointed e.g. where indicated at XX in FIG. 5, to its respective stub 49.

Figure 6:
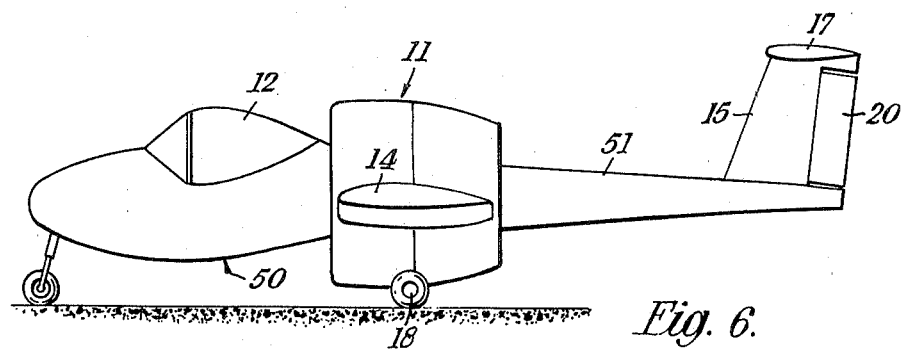
FIGS. 6 and 7 are respectively elevation and plan views of a second aircraft according to the invention.
Figure 7:
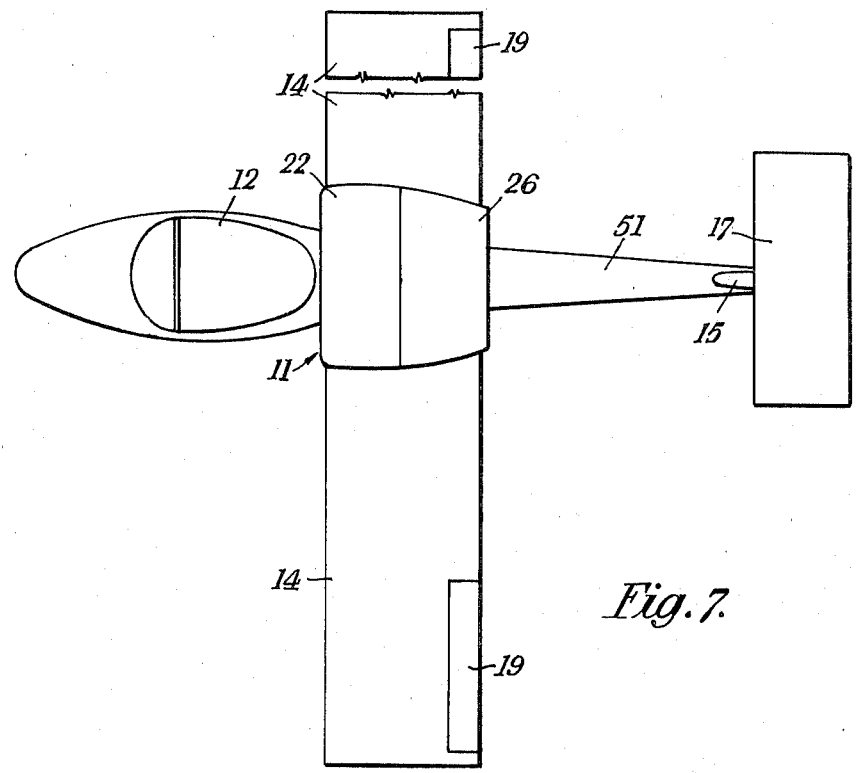

Many of the components of the second aircraft, as shown in FIGS. 6 and 7, are common to those of the aircraft first illustrated and like reference numerals are employed to identify such components. The aircraft has a cabin unit 50, including the cabin 12, forward of the propeller 13 and a single boom 51 extending aft of the shroud 11 which carries a tailplane 17 and a single fin 15, the cabin unit 50 being connected to the shroud 11 by cabin stators as described above, the mainplane 14 being supported by the shroud 11 in like manner to that shown in FIG. 5 and the boom 51 being carried by aft stators as described below with reference to FIGS. 8 and 9.

Figure 8:
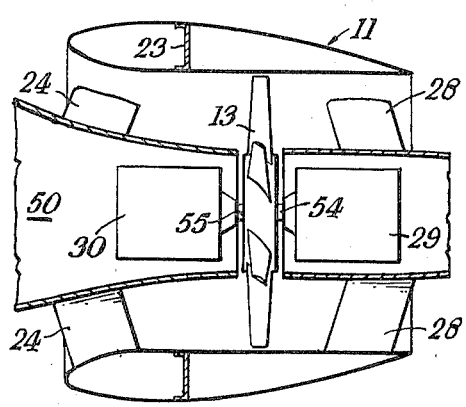
FIG. 8 is a vertical section of the ducted propeller of the aircraft of FIGS. 6 and 7.
Figure 9:
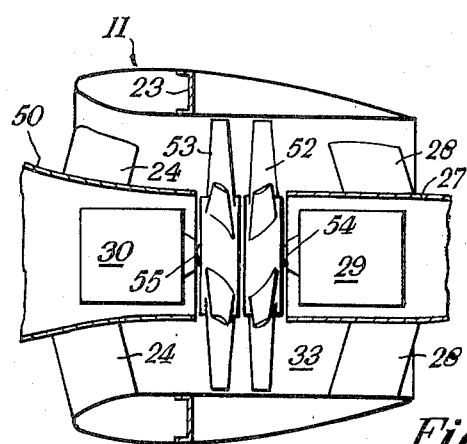
FIG. 9 is a section similar to that of FIG. 8 illustrating a variant.

The propeller may be driven by any suitable type of prime mover and, as shown in FIGS. 8 and 9, for increased power and safety by a pair of engines 29 and 30 respectively behind and one in front of the propeller 13. In such a case there may be provision, as mentioned above with reference to FIG. 3, for disconnecting the drive of either engine, e.g. in the event of its failure. In the variant illustrated in FIG. 9 there are two propellers 52 and 53 in series each driven by its own engine 29 and 30 respectively in place of the single propeller 13 of FIGS. 3 and 8. The propellers in this case may be driven in contra-rotation, a technique known *per se,* but it is also proposed for each propeller 52 and 53 to be driven by its respective engine 29 and 30 so as to rotate in the same sense as the other with provision for synchronising the rotation of the propellers. The latter case may have no advantages over contra-rotation from the points of view of thrust production or safety, but it is believed that such an arrangement may permit quieter operation.

To overcome any potential "vibration" problems, the or each propeller runs in bearings separated from the or each engine by which it is driven, the propeller being connected to the engine by way of a flexible shaft coupling (shown as 54 and 55 in the drawing). To maintain a constant clearance between the shroud 11 and the blade tips 43 irrespective of the deflection of the shroud, the propeller can be encompassed by a rigid ring such as is described above in connection with FIG. 4.

It will be appreciated that an arrangement such as is shown in FIGS. 3 and 4 in which the propeller is mounted directly on to the prime mover could be employed in an aircraft as shown in FIGS. 6 and 7 by supporting the single tail boom 51 on the front portion 22 of the shroud. Again, the arrangement of FIG. 8 or 9 could replace the FIG. 3 arrangement in the FIGS. 1 and 2 aircraft.

Figure 10:
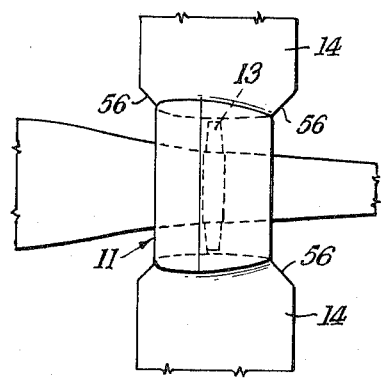
FIGS. 10 and 11 are respectively partial plan views of variants of the aircraft according to FIGS. 6 and 7.
Figure 11:
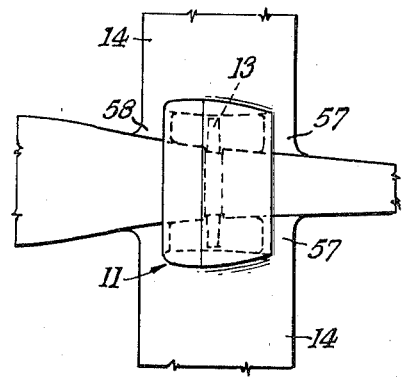

As will be appreciated, to eliminate turbulent mainplane airflow from entering the duct 33 it is greatly to be preferred that the chord of the mainplane is no greater than that of the shroud and that the leading edge of the mainplane does not lie forward of the leading edge of the shroud. However, if circumstances dictate that the mainplane chord exceed the shroud chord, then it may be possible to employ a construction such as that illustrated in FIG. 10 or FIG. 11. In FIG. 10, the mainplane has convergent roots 56 whilst in FIG. 11, which is believed to represent the more favorable of the two constructions, the chord of the mainplane is effectively maintained by the use of two aft fillets 57, interconnecting the mainplane 14 and the boom 51 at each side thereof. The thickness of such fillets, which as shown in FIG. 11 terminate only a short way into the duct 33 is considerably less than that of the mainplane 14 in its root regions and in this sense they are analogous to the above-mentioned aft stator blades. If, structurally, they serve to replace two of the aft stator blades nevertheless they do not assume the stated function of the shroud to bear the bending and torsional stresses of the mainplane. It is also conceivable that a pair of forward fillets 58 could be provided and if so could replace two of the cabin stators. Such an arrangement, however, would almost certainly generate some turbulent airflow within the duct 33 which, if significant, would render the arrangement unacceptable. The shroud 11 could be extended locally to form fences to prevent wing-induced vortices rolling into the duct 33.

In each aircraft embodiment described above, the duct 33 is free from exposure to any portion of the turbulent airflow emanating from the mainplane 14 during flight. This affords greater propulsive efficiency and lower noise generation than is possible with the prior art aircraft mentioned above. The only structure within or immediately upstream of the duct having an effect upon the airflow incident to the propeller(s) is the structure of the cabin stator blades 24 the smooth, inner skin 45 of the shroud 11, the exterior surface of the cabin 12 and unit 50 and, in the example of FIG. 7, the fillets 58, each of which structures is configured for minimal disturbance of the duct airflow. The cumulative effect of these structures is very much less than that of a mainplane disposed upstream of the duct as in the prior art. Furthermore, it is preferred that at least that portion of the cabin 12 or cabin unit 50 which is immediately upstream of the propeller duct is of smooth profile, and most preferably of circular or near-circular, cross-section, in order to minimize the effect of its presence upon the flow through the duct.

Figure 12:
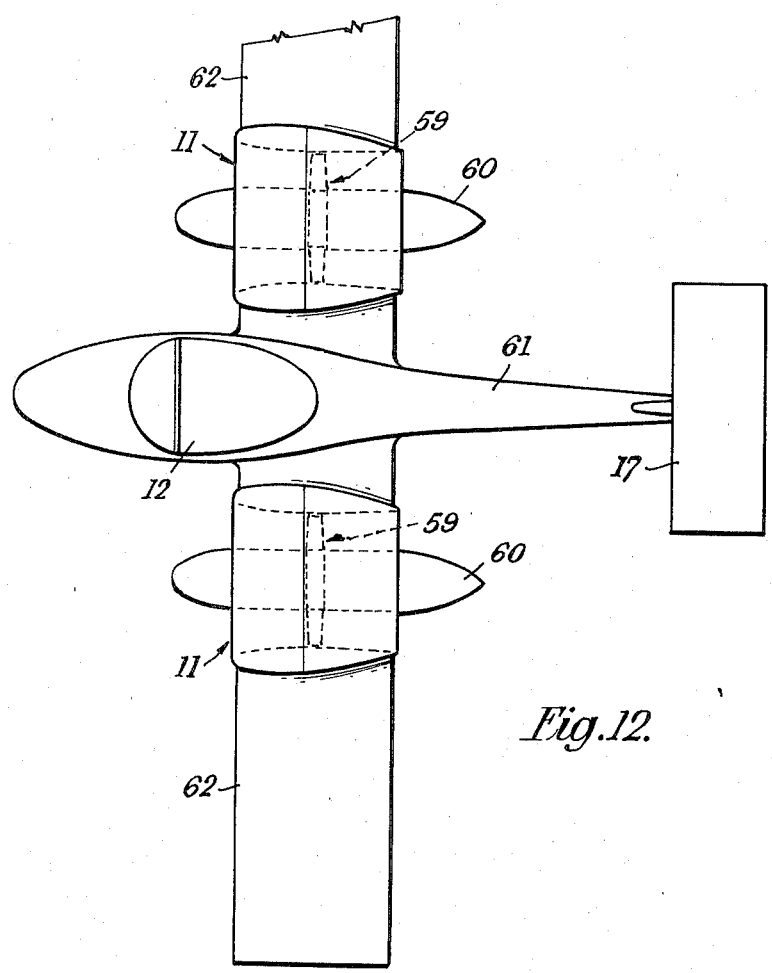
FIG. 12 is a plan view of a third aircraft according to the invention.

The embodiment of FIG. 12 has a ducted propeller 59 within the span of each wing 62 of the mainplane, (only one being shown in full in the Figure). The installation of each ducted propeller between two portions of the span of the mainplane is entirely analogous to the central installation of the ducted propeller in the embodiments described above with reference to FIGS. 1 to 11, each power plant having a nacelle 60 for an engine. Unlike the earlier-described embodiments the aircraft of FIG. 12 has a conventional fuselage 61. Repetition of description in relation to this embodiment is deemed to be unnecessary.

It has previously been proposed to use a ducted propeller in substitution for a conventional, unshrouded propeller in applications where the "swirl" generated by an unshrouded propeller is unwelcome. Such applications include crop spraying and training aircraft. The aircraft according to the present invention will therefore find application in these fields as well as in applications where excellent visibility is required, such as for miscellaneous ground-observing tasks.

I claim:

1. An aircraft having lift-producing means comprising a mainplane, a prime mover, a propeller with a hub operatively driven by the prime mover in use to produce by movement through the ambient air sufficient thrust for flight of the aircraft, the propeller being located intermediate the port and starboard ends of the mainplane, and an annular shroud including a mainplane support portion, the shroud comprising:
   (i) a duct surrounding the propeller defining an upstream end so located relative to the lift producing means that it is unimpinged or substantially upimpinged upon by any portion of the turbulent airflow emanating from the lift producing means;
   (ii) said mainplane support portion of said shroud being the or a primary load path along which torsional and bending stresses to which the mainplane is subject in use are passed between the portion of the mainplane to the port side of the shroud and the portion of the mainplane to the starboard side of the shroud;
   (iii) said shroud including a trailing portion within which the propeller rotates;
   (iv) said propeller being mounted to the prime mover, and the prime mover being fixedly mounted to the trailing portion of the shroud, so that the propeller is held substantially fixed against transverse movement relative to the longitudinal axis of the trailing portion of the shroud; and
   (v) said trailing portion of the shroud being mounted to the mainplane support portion of the shroud by resilient mounting blocks which serve to isolate vibrations of the prime mover in directions transverse to the longitudinal axis of the aircraft in the trailing portion from the mainplane support portion of the shroud.

2. An aircraft according to claim 1, characterized in that it comprises an aerodynamically smooth cabin mounted to the mainplane support portion of the shroud forward of the propeller by stator elements whereby substantially non-turbulent air flows to the tips of the propeller blades around all sides of the cabin, and the mainplane comprises a port and starboard wing each attached at its root end to the mainplane support portion of the shroud.

3. An aircraft according to claim 2, which includes a tailplane supported on twin port and starboard booms which are carried by and extend rearwardly from the port and starboard wings respectively.

4. An aircraft according to claim 1, wherein the prime mover is located aft of the propeller.

5. An aircraft according to claim 4, wherein a second prime mover is carried by the shroud and located forward of and in line with the propeller and is operatively connected to said propeller.

6. An aircraft according to claim 4, wherein a second prime mover is carried by the shroud and located forward of and in line with the propeller and is operatively connected to a second propeller located in line with and forward of the first-mentioned propeller.

7. An aircraft according to claim 1, wherein said mainplane support portion of the shroud includes a plurality of brackets projecting toward said trailing portion of said shroud, said trailing portion of the shroud includes a plurality of brackets projecting toward said mainplane support portion, said resilient mounting blocks being disposed between said brackets and a bolt being disposed within apertures in said brackets for permitting a limited degree of movement between said trailing portion of said shroud and said mainplane support portion.

8. An aircraft according to claim 7, wherein the apertures in said brackets projecting toward said trailing portion of the shroud are larger in diameter relative to the diameter of said bolt.

9. An aircraft according to claim 7, and further including a spacer disposed around said bolt and being operatively positioned between respective pairs of said brackets to prevent over-tightening of said bolt.

10. An aircraft according to claim 1, wherein said resilient mounting blocks are constructed of an elastomeric material.

11. An aircraft according to claim 1, wherein said trailing portion of said shroud includes a circular ring portion disposed in close proximity to the tips of said propeller.

12. An aircraft according to claim 11, wherein said circular ring portion is a box-section including an annulus of material disposed adjacent to said tip portions of said propeller.

13. An aircraft according to claim 12, wherein said annulus of material is rigid polyurethane foam.

14. An aircraft according to claim 12, wherein the working clearance between said annulus of material and said tip portions of said propeller is on the order of 1 to 2 mm. for each meter of propeller diameter.

15. An aircraft according to claim 1, wherein said mainplane support portion of said shroud includes a substantially circular main spar disposed within said shroud being operatively connected to main spars of said mainplane.

16. An aircraft according to claim 1, wherein said primer mover is disposed within a nacelle and stator blades operatively affix said nacelle to said trailing portion of said shroud.

* * * * *